US010151888B2

(12) United States Patent
Badehi et al.

(10) Patent No.: US 10,151,888 B2
(45) Date of Patent: Dec. 11, 2018

(54) OPTICAL WAVEGUIDE STRUCTURE

(71) Applicant: Mellanox Technologies, LTD., Yokneam (IL)

(72) Inventors: Pierre Avner Badehi, Yehuda (IL); Yaniv Kazav, Hadera (IL); Soren Balslev, Jægerspris (DK); Anna Sandomirsky, Nesher (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 15/472,703

(22) Filed: Mar. 29, 2017

(65) Prior Publication Data

US 2018/0284372 A1 Oct. 4, 2018

(51) Int. Cl.
*G02B 6/36* (2006.01)
*G02B 6/42* (2006.01)
*G02B 6/38* (2006.01)

(52) U.S. Cl.
CPC ......... *G02B 6/3861* (2013.01); *G02B 6/3636* (2013.01); *G02B 6/3652* (2013.01); *G02B 6/423* (2013.01); *G02B 6/4239* (2013.01); *G02B 6/4243* (2013.01)

(58) Field of Classification Search
None
See application file for complete search history.

(56) References Cited

U.S. PATENT DOCUMENTS

| 4,639,074 A * | 1/1987 | Murphy | G02B 6/30 385/49 |
| 5,631,988 A * | 5/1997 | Swirhun | G02B 6/245 385/89 |
| 5,716,556 A * | 2/1998 | Heard | G02B 6/1221 264/1.24 |
| 6,808,322 B2 * | 10/2004 | Freund | G02B 6/3636 385/114 |
| 6,986,608 B2 * | 1/2006 | Choudhury | G02B 6/30 385/53 |

(Continued)

FOREIGN PATENT DOCUMENTS

| EP | 0591941 A1 * | 4/1994 | ............... G02B 6/30 |
| JP | 04077705 A * | 3/1992 | |

OTHER PUBLICATIONS

Yoshimura et al. (Machine Translation of JP 04-077705 A, Mar. 1992).*

*Primary Examiner* — Michelle R Connelly
(74) *Attorney, Agent, or Firm* — Alston & Bird LLP

(57) ABSTRACT

Methods and associated apparatuses are described that provide an optical waveguide structure configured for use within an optoelectronic connector. The optical waveguide structure includes a base member having a first surface defining a plurality of trenches including an optical transmission medium and one or more channels including an adhesive material. The optical waveguide structure includes a lid member having a first surface, where the first surface of the lid member is disposed against the first surface of the base member to form the optical waveguide structure. The one or more channels having the adhesive material serve to secure the lid member to the base member, and the plurality of trenches having an optical transmission medium allow optical signals to pass therethrough.

10 Claims, 10 Drawing Sheets

(56) References Cited

U.S. PATENT DOCUMENTS

| | | | | |
|---|---|---|---|---|
| 2003/0152338 A1* | 8/2003 | Kuhara | ................... | G02B 6/42 |
| | | | | 385/89 |
| 2007/0019920 A1* | 1/2007 | Tanaka | ................. | G02B 6/3636 |
| | | | | 385/137 |
| 2008/0138010 A1* | 6/2008 | Dou | ....................... | B07C 5/342 |
| | | | | 385/16 |
| 2008/0226222 A1* | 9/2008 | Kim | ..................... | G02B 6/423 |
| | | | | 385/14 |
| 2015/0301290 A1* | 10/2015 | Fujiwara | ............. | G02B 6/3838 |
| | | | | 385/83 |
| 2016/0154188 A1* | 6/2016 | Nakagawa | ........... | G02B 6/3861 |
| | | | | 385/80 |
| 2016/0170161 A1* | 6/2016 | Lee | ..................... | G02B 6/4239 |
| | | | | 385/93 |
| 2017/0261701 A1* | 9/2017 | Izawa | ..................... | G02B 6/42 |

* cited by examiner

OPTICAL WAVEGUIDE STRUCTURE

BACKGROUND

The present disclosure relates in general to optoelectronic connectors used in datacenter switch systems. In particular, methods of manufacturing optical waveguide structures and optical jumpers used in optoelectronic connectors are described that are configured to reduce the production costs associated with traditional manufacturing techniques.

Datacenter switch systems and associated networking modules may generally include connections between other switch systems, servers, and devices. Such connections may be made using cables, transceivers, and optoelectronic connectors, which may include an optical waveguide structure or optical jumper. Often, the high costs associated with producing optoelectronic connector assemblies are determined in large part by the high manufacturing costs associated with traditional optical jumper elements utilized therein.

BRIEF SUMMARY

Accordingly, the apparatuses and methods described herein provide improved mechanisms for cost effective optical jumpers and optical waveguide structures for use in optoelectronic connectors. In some embodiments, a method for manufacturing an optical waveguide structure for use within an optoelectronic connector includes forming a base member having a first surface, where the first surface defines a plurality of trenches configured to receive an optical transmission medium, one or more channels configured to receive an adhesive material, a primary reservoir in fluid communication with the plurality of trenches, and a secondary reservoir in fluid communication with the one or more channels. The method may include forming a lid member having a first surface, wherein the first surface of the lid member is configured to be disposed against the first surface of the base member, and placing the lid member on the base member such that the lid member covers at least a portion of the plurality of trenches and at least a portion of the one or more channels. The method may also include introducing a liquid optical transmission medium into the primary reservoir such that the liquid optical transmission medium fills the plurality of trenches defined by the base member, and introducing a liquid adhesive into the secondary reservoir such that the liquid adhesive fills the one or more channels defined by the base member, thereby affixing the lid member to the base member.

In some embodiments, the liquid optical transmission medium and the liquid adhesive may fill the plurality of trenches and the one or more channels, respectively, via capillary flow.

In some cases, the method may include forming the base member by sizing the base member to be larger than the lid member, such that at least a portion of the base member extends beyond an edge of the lid member.

In some further cases, the primary reservoir and the secondary reservoir may be disposed on the portion of the base member which extends beyond the edge of the lid member.

In some still further cases, the method may include removing the portion of the base member which extends beyond the edge of the lid member.

In some embodiments, the method may include finishing an outer surface of the optical waveguide structure to facilitate transmission of optical signals therethrough as well as forming through-holes on the optical waveguide structure, wherein the through-holes are configured to allow the optical waveguide structure to be received and secured within the optoelectronic connector.

In some embodiments, forming the lid member and forming the base member may be achieved via a hot embossing process.

In other embodiments, the primary reservoir may include two or more primary reservoirs and the secondary reservoir may include two or more secondary reservoirs, wherein each primary reservoir and each secondary reservoir is in fluid communication with a portion of the plurality of trenches and a portion of the one or more channels, respectively.

In some alternate embodiments, the base member may include at least one groove and the lid member may include at least one corresponding groove such that the optical waveguide structure is configured to receive an engagement element when the lid member is placed on the base member.

In yet another embodiment, an optical waveguide structure for use within an optoelectronic connector is provided that include a base member having a first surface, the first surface defining a plurality of trenches including an optical transmission medium, and one or more channels comprising an adhesive material. The optical waveguide structure may include a lid member having a first surface, wherein the first surface of the lid member is configured to be disposed against the first surface of the base member, wherein the one or more channels comprising the adhesive material are configured to affix the lid member to the base member, wherein the plurality of trenches comprising an optical transmission medium allow optical signals to pass therethrough.

In some cases, each trench further may include a base trench wall and two longitudinal trench walls, wherein the base trench wall is substantially perpendicular to the two longitudinal trench walls.

In some other embodiments, the optical waveguide structure may define one or more through-holes, wherein the through-holes are configured to allow the optical waveguide structure to be received and secured within the optoelectronic connector.

In yet another example embodiments, a transceiver assembly configured to allow conversion between optical and electrical signals may be disposed proximate the optical transmission medium.

In some cases, the optical transmission medium may include a first material and the base member and lid member may include a second material, wherein the index of refraction of the first material is greater than the index of refraction of the second material.

In other cases, the base member further may include at least one groove and the lid member may include at least one corresponding groove such that the optical waveguide structure is configured to receive an engagement element when the lid member is placed on the base member.

The optical waveguide structure, in some embodiments, may further include a pin disposed within the at least one groove of the base member and the at least one corresponding groove of the lid member such that the pin is configured to engage a corresponding cavity defined by an optoelectronic connector.

The optical waveguide structure may further include an alignment feature and the lid member may include a corresponding alignment feature, wherein the alignment feature of the base member and the alignment feature of the lid member are configured to align the lid member to a defined position with respect to the base member when the lid member is placed on the base member.

The optical waveguide structure may further include an outer surface of the optical waveguide structure that is finished to facilitate transmission of optical signals therethrough.

In some other embodiments, the optical transmission medium and the adhesive may be disposed within the plurality of trenches and the one or more channels, respectively, via capillary flow.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

Overview

Figure 1:
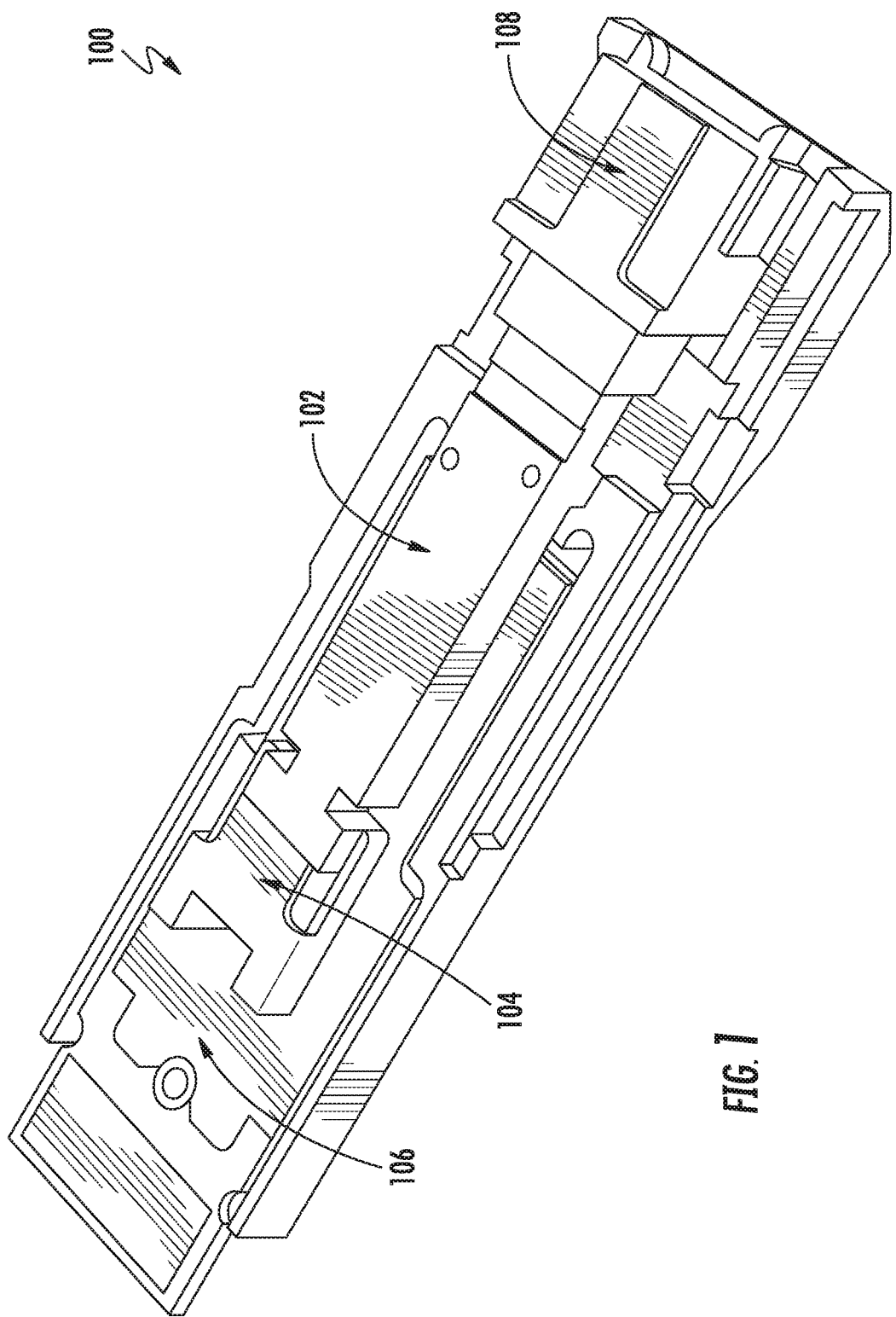
FIG. 1 is a perspective view of an optoelectronic connector and associated optical waveguide structure for use in accordance with some embodiments discussed herein.

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. As used herein, the term "optical waveguide structure" may include optical jumpers and may encompass any structure configured to allow light to propagate therethrough, notably containing regions made of materials having a relatively higher refractive index as compared to surrounding structure. As discussed herein, example embodiments may be described with reference to an active optical cable (AOC), optical cable, electro-optical transmit/ receive module, or optical fiber as a transmission medium. However, the present disclosure may be equally applicable for use with any cable (e.g., passive copper cable (PCC), active copper cable (ACC), or the like) or electro-optical transmit/receive module, used in datacenter racks and associated switch modules (e.g., an active optical module (AOM), quad small form-factor pluggable (QSFP), or the like). Additionally, as discussed herein, the example embodiment may be described with reference to a vertical-cavity surface-emitting laser (VCSEL) as an element of a transceiver system. However, the present disclosure may be equally applicable for use with any transceiver system element, and/or light source (e.g., laser).

Extensive growth in global internet traffic due to increasing demands for high-definition video and high-speed broadband penetration has required new hardware that allows for higher data transmission rates in datacenters. This growth has resulted in the use of optical fibers offering enhanced capacity (e.g., greater bandwidth) over distance, increased bandwidth density, greater security and flexibility, and lower costs as compared to conventionally-used copper cables.

Accordingly, various different types of optoelectronic connectors also exist for enabling transmission of signals (optical and/or electrical) between switch modules and other equipment in a datacenter. For example, Quad Small Form-factor Pluggable (QSFP) connectors and cables, as well as other forms of connectors such as Small Form Pluggable (SFP) and C-Form-factor Pluggable (CFP) connectors, have long been the industry standard for providing high-speed information operations interface interconnects. More recently, Octal Small Form-factor Pluggable (OSFP) transceivers have come about to provide increased bit rate capabilities of up to 400 Gbps. Transceiver systems and optical waveguide structures may be used to interface with a switch system board and convert between optical and electrical signals, regardless of the type of optoelectronic connector. Many optoelectronic connectors include a printed circuit board, transceiver assembly or system, optical waveguide structure or jumper, and ferrule.

With reference to FIG. 1, an example optoelectronic connector 100 is illustrated. The optoelectronic connector 100 may include a printed circuit board (PCB) 106, a transceiver system 104, and a mechanical transfer ferrule 108. The optoelectronic connector 100 may be configured to be received by a datacenter rack (e.g., networking box, module, or the like) such that the PCB 106 may be in electrical communication with other equipment in the datacenter rack. The example optoelectronic connector 100 may further be configured to transmit optical signals via an optical cable (not shown) connected to a corresponding optoelectronic connector disposed on the opposite end of the optical cable. The optoelectronic connector 100 may utilize a transceiver system 104 to convert between optical and electrical signals. By way of example, an electrical signal received by the PCB 106 from a datacenter rack or networking box in electrical communication with the optoelectronic connector 100 may be converted by the transceiver system 104 to an optical signal for transmission via an optical cable to another datacenter rack or networking box. To facilitate this transmission, many optoelectronic connectors utilize optical jumpers (e.g., patch cords, fiber jumpers, etc.) to connect end devices (e.g., transceiver systems) to structured networking cabling (e.g., an optical cable ribbon, or the like). Traditional optoelectronic connectors often utilize an optical fiber ribbon as a waveguide to connect between a transceiver system disposed on one end of the jumper and the optical cable disposed on the opposite end of the jumper. As seen in FIG. 1, an optical waveguide structure 102 may be used as an optical jumper or waveguide to connect end devices to structured network cabling. Additionally, optoelectronic connectors often use mechanical transfer ferrules 108 disposed on an end of the optical jumper or waveguide as a ring or cap to prevent damage, splitting, or wear to the optical fibers. However, traditional optical fiber jumpers generally involve expensive manufacturing procedures that result in increasing the overall cost of an optoelectronic connector, as well as the associated datacenter racks, which typically contain a plurality of optoelectronic connectors.

Accordingly, embodiments of the invention described herein provide an optical waveguide structure and associated methods of manufacturing, where the structure allows optical transmission between optoelectronic elements, but reduces production costs by utilizing non-traditional processing methods.

Optical Waveguide Structure

Figure 2:
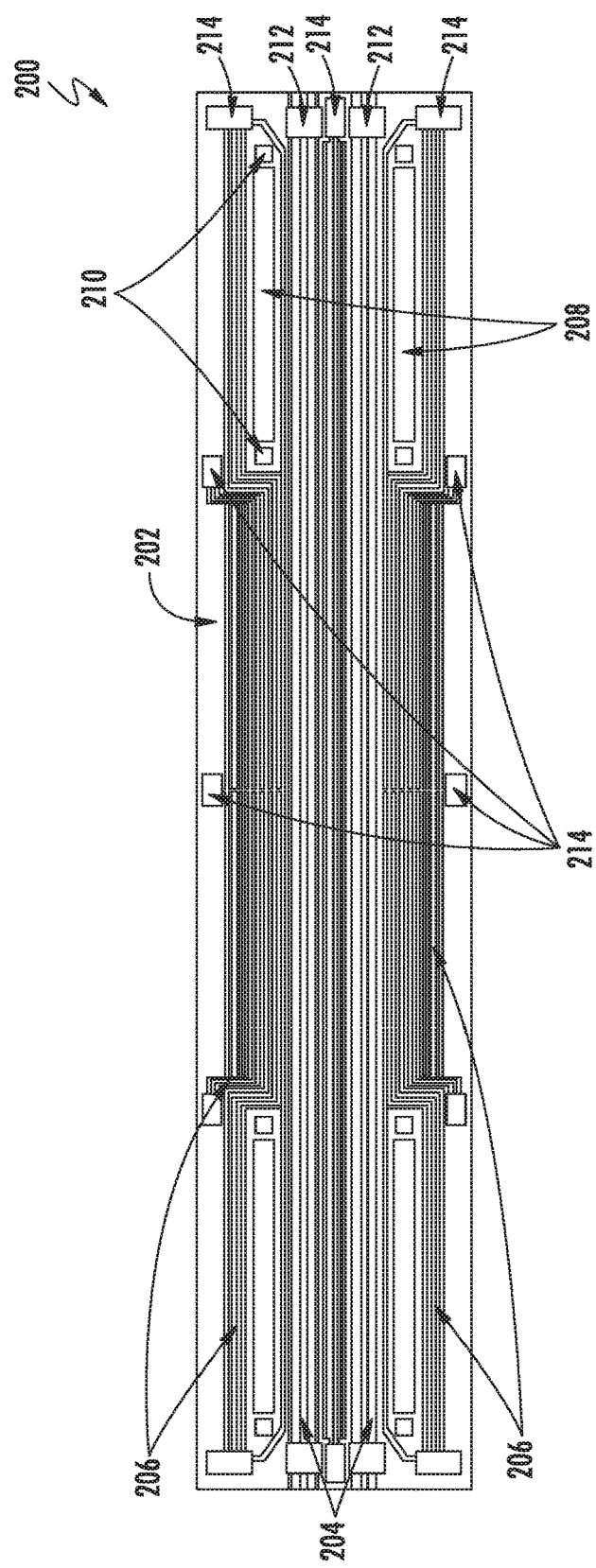
FIG. 2 is a top view of an optical waveguide base member according to an example embodiment.

With reference to FIG. 2, a top view of a base member 200 is illustrated. The base member 200 may be configured to engage and be secured to a lid member 400 (e.g., shown in FIG. 4), and, with the use of an optical transmission medium disposed therein, may form an optical waveguide structure in accordance with embodiments described herein.

The base member 200 may have a first surface 202, which may define a plurality of trenches 204 comprising an optical transmission medium (e.g., core material). An optical transmission medium may encompass any material through which light may be transmitted. By way of example, the base member 200 may be disposed proximate a transceiver system (e.g., transceiver system 104 in FIG. 1) such that an optical signal may be transmitted by the transceiver system through the optical transmission medium disposed within the plurality of trenches 204.

Figure 2A:
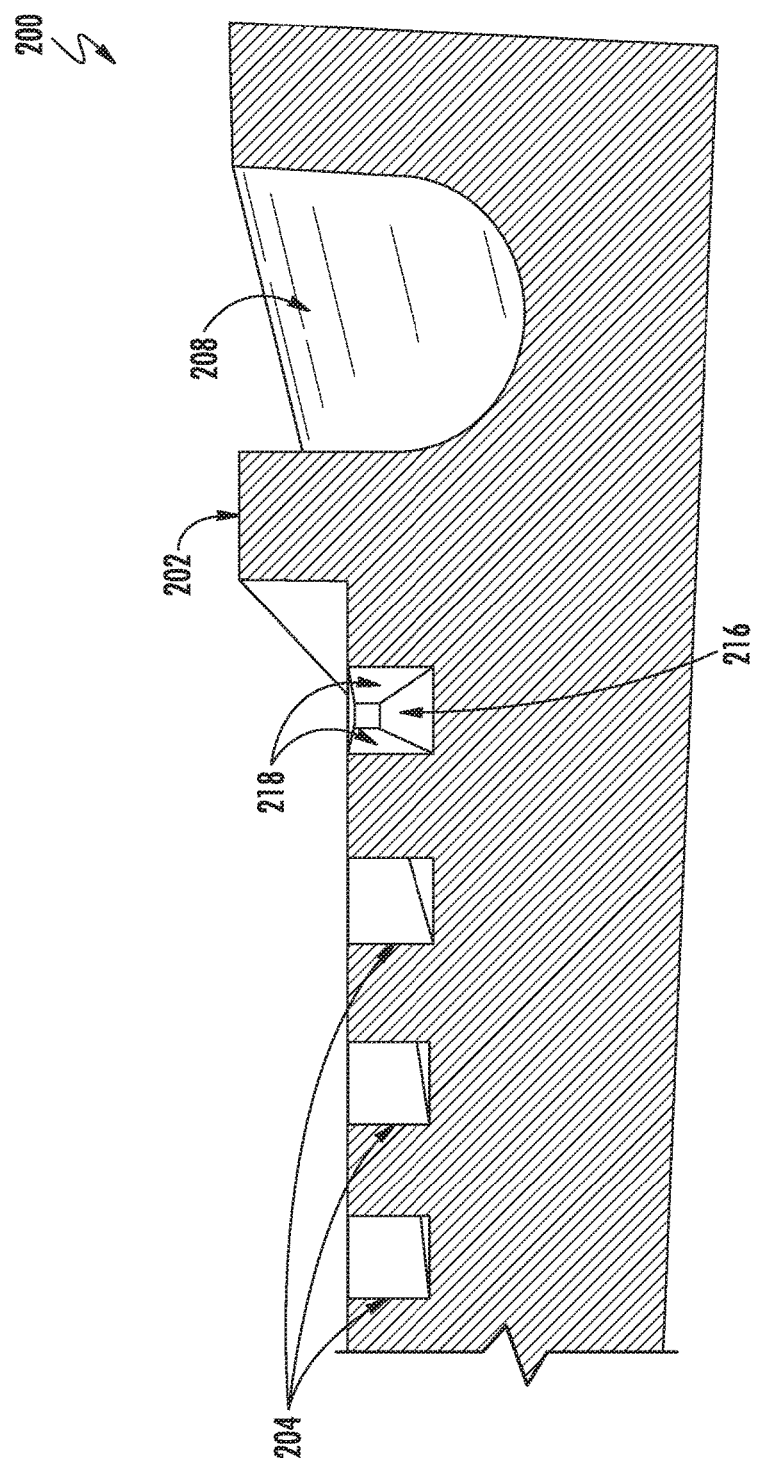
FIG. 2A is a side cut away view of an optical waveguide base member of FIG. 2 according to an example embodiment.
Figure 9A:
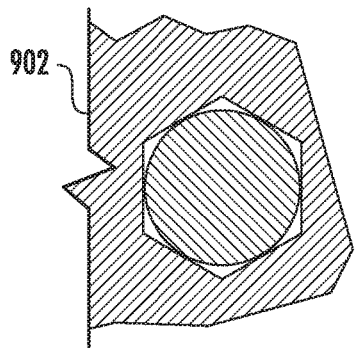
FIGS. 9A-9C illustrate alternative engagement element, trench, and channel configurations.
Figure 9B:
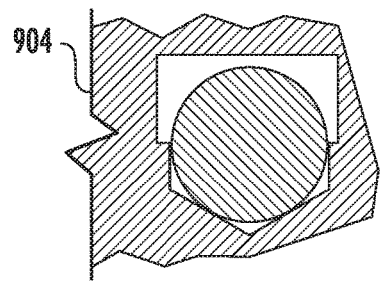
Figure 9C:
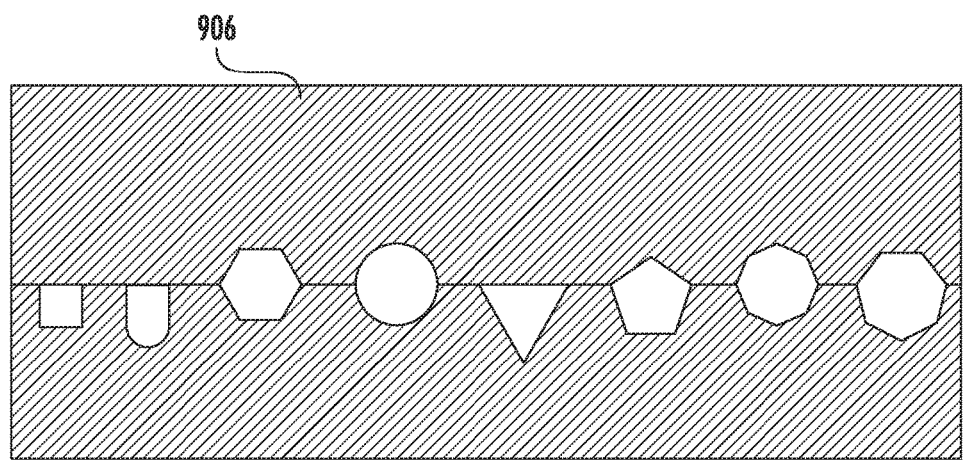

As illustrated in FIG. 2A, in some embodiments, the plurality of trenches 204 may be configured such that each trench further comprises a base trench wall 216 and two longitudinal trench walls 218, wherein the base trench wall 216 is substantially perpendicular to the two longitudinal trench walls 218. By way of a more particular example, each trench of the plurality of trenches 204 may have a rectangular cross-section. Accordingly, the optical transmission medium (not shown) may also have a rectangular cross-section corresponding to the cross-section of the trenches 204. As shown in FIG. 9C, although the plurality of trenches 204 are described in reference to a rectangular cross-section, the present disclosure contemplates that the plurality of trenches 204 may have any cross-sectional shape (e.g., hexagonal, octagonal, triangular, half-hexagonal, half-octagonal, circular, semi-circular, or the like). Similarly, although described in reference to a rectangular cross-section, the present disclosure contemplates that the optical transmission medium may also have any cross-sectional shape (e.g., hexagonal, octagonal, triangular, half-hexagonal, half-octagonal, circular, semi-circular or the like) configured to allow light to be transmitted therethrough.

In some embodiments, the optical transmission medium may comprise a first material and the base member 200 may comprise a second material, wherein the index of refraction of the first material is greater than the index of refraction of the second material. By way of example, the optical transmission medium disposed in the plurality of trenches 204 may comprise a transparent material capable of transmitting light (e.g., an optical signal) therethrough, while the base member 200 may comprise a material configured to maintain the optical signal (e.g., refracted light waves) within the plurality of trenches 204, thereby causing the optical transmission medium to function as a waveguide. As depicted in FIG. 2, in some embodiments, the plurality of trenches 204 may be disposed proximate the mid-line of the base member 200. However, the present disclosure contemplates that the plurality of trenches 204 may be disposed at any location on the first surface 202 of the base member 200, such that light may be transmitted through the optical transmission medium disposed therein.

The first surface 202 of the base member 200 may further define one or more channels 206. The one or more channels 206 may comprise an adhesive material disposed therein and, as discussed in detail below, may be configured to affix the base member 200 to the lid member 400 (FIG. 4) of the optical waveguide structure 102. By way of example, the one or more channels 206 may be filled with a liquid adhesive during the manufacturing process that is configured to harden (e.g., by ultra-violet curing or the like) or otherwise cure after a period of time has elapsed, so as to affix the lid member (e.g., the lid member 400 in FIG. 4) to the base member 200. As depicted in FIG. 2, in some embodiments, the one or more channels 206 may be disposed proximate the edge of the base member 200 and or on the mid-line of the base member. However, the present disclosure contemplates that the one or more channels 206 may be disposed at any location on the first surface 202 of the base member 200 such that the base member 200 may be affixed or secured to the surface of the lid member 400. The present disclosure contemplates that the one or more channels 206 may comprise a single channel or a plurality of channels disposed at any location on the first surface 202 so long as the one or more channels 206 are sufficient to secure or otherwise affix the base member 200 to the lid member 400.

With continued reference to FIG. 2, the first surface 202 of the base member 200 may further define an engagement element cavity 208 and one or more alignment features 210. The cavity 208 may, in some embodiments, be defined as a semi-cylindrical cavity (e.g., channel, trench, depression, groove, or the like) disposed parallel to the plurality of trenches and one or more channels. Such an engagement element cavity 208 may be configured to mate with a corresponding semi-cylindrical cavity defined by the lid member 400 as described below with reference to FIG. 4 so as to affix the lid member to the first surface 202 of the base member 200. By way of example, and described below with reference to FIG. 6, the base member 200 may connect to the lid member 400 such that a hollow cylindrical cavity (e.g., cylindrical engagement cavities 610 in FIG. 6) is formed. The hollow cylindrical cavity 610 may be configured to receive an engagement element (e.g., pin, lip, extension, flange, or the like) from an optoelectronic connector (e.g., optoelectronic connector 100 in FIG. 1), thereby allowing the optical waveguide structure to be secured within the optoelectronic connector. An engagement element (e.g., engagement element 606 in FIG. 6) disposed within the hollow cylindrical cavity 610 may further be configured to align the optical waveguide structure along an optical path when the optical waveguide structure is secured within an optoelectronic connector. Although described with reference to a cylindrical cavity and corresponding cylindrical engagement element, the present disclosure, as described herein, contemplates that the engagement cavities and corresponding engagement elements may comprise any cross-sectional shape.

Although cavity 208 is depicted in FIG. 2 as a semi-cylindrical cavity disposed parallel to the plurality of trenches and the one or more channels, the present disclosure contemplates that the cavity 208 may be positioned at any location on the first surface 202 so as to mate with a corresponding cavity of the lid member in order to receive an engagement element therein. As shown in FIGS. 9A-9B, although the cavity 208 is described as a semi-cylindrical cavity, the present disclosure contemplates that the cavity 208 may have any cross-sectional shape (e.g., hexagonal, octagonal, triangular, half-hexagonal, half-octagonal, circular, semi-circular or the like). Further, although the plurality of trenches 204, the one or more channels 206, and the engagement element cavity 208 are described as defined by the first surface 202 of the base member 200, the present disclosure contemplates that the lid member (e.g., lid member 400 in FIG. 4) may define any portion of the plurality of trenches 204, the one or more channels 206, and the engagement element cavity 208. By way of example, the first surface 202 may define a plurality of trenches with semi-circular cross-sections while the lid member (e.g., lid member 400 in FIG. 4) defines a corresponding plurality of trenches with corresponding semi-circular cross-sections.

The first surface 202 of the base member 200 may further define one or more alignment features 210. The one or more alignment features 210 may, in some embodiments, comprise a male alignment feature (e.g., tab, lip, snap, fastener, ridge, protrusion, or the like) configured to engage a corresponding female alignment feature defined by the lid member 400 (FIG. 4) that is affixed to the first surface 202 of the base member 200 to form the optoelectronic waveguide structure. Similar to the engagement element cavity 208 described above, the present disclosure contemplates that the one or more alignment features 210 may be positioned at any location on the first surface 202 so as to mate with a corresponding alignment feature in order to align the components of the optical waveguide structure (base member and lid member) with respect to each other. As is evident by the nature of optical signal transmission, the alignment of members utilized in optical waveguide structures may require precise calibration to ensure accurate optical signal transmission and minimize signal losses. In this regard, the engagement element cavity 208 and the one or more alignment features 210 may be precisely positioned and calibrated in order to ensure optical signals may accurately be transmitted via the optical transmission medium disposed within the plurality of trenches 204. In some embodiments, the cavity 208 may be configured such that a male engagement feature (e.g., engagement element 606 in FIG. 6) may be affixed within the cavity 208 such that the optical waveguide structure 102 may be connected with a fiber connector end to connect the optical waveguide structure 102 with a datacenter rack, module, connector, element, or the like.

Figure 3:
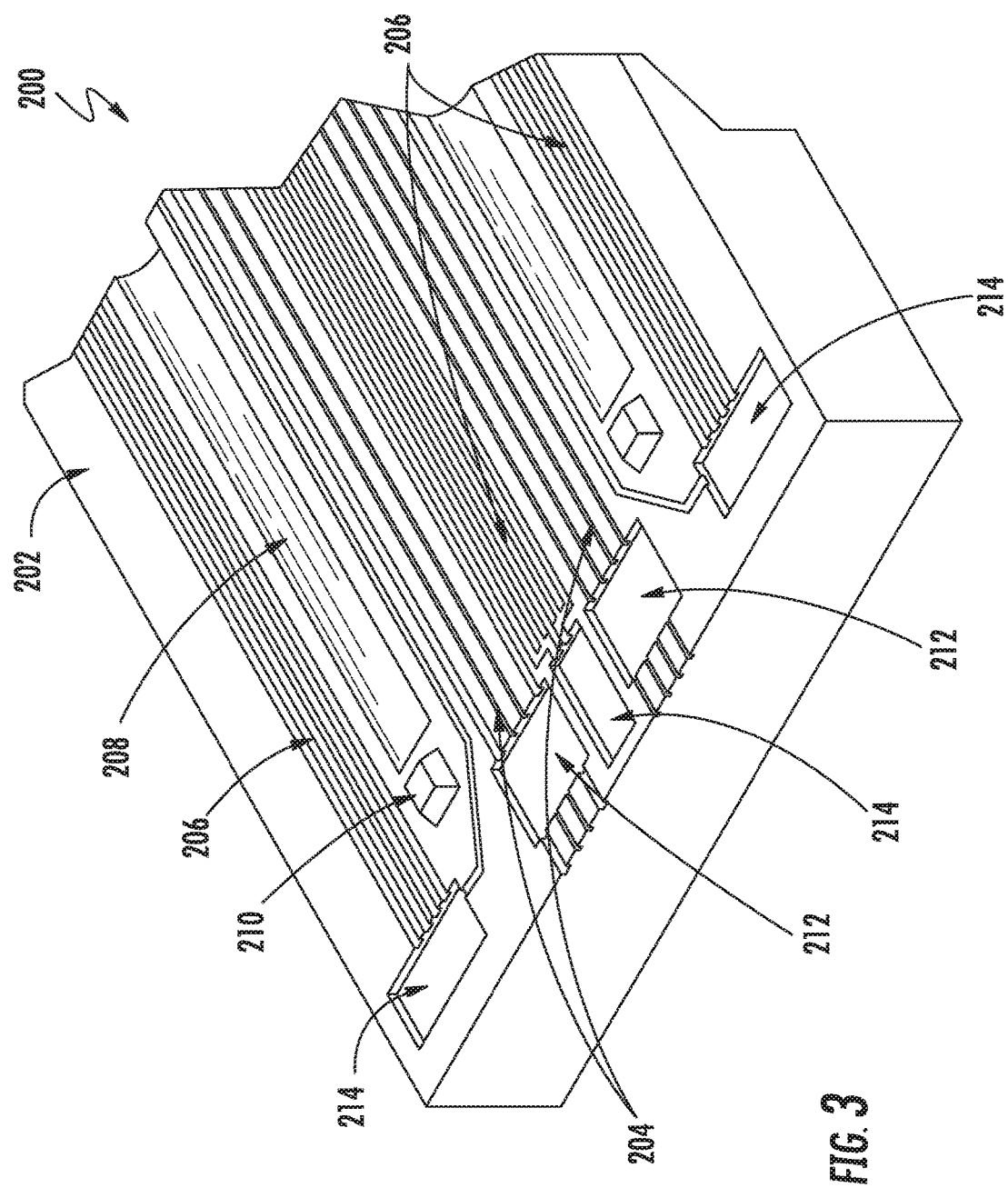
FIG. 3 is a perspective cut away view of the optical waveguide base member of FIG. 2 according to an example embodiment.

With reference to FIG. 3, a perspective cut away view of the base member 200 is illustrated. In some embodiments, the first surface 202 of the base member 200 may define primary reservoirs 212 and secondary reservoirs 214. The primary reservoirs 212 may be in fluid communication with the plurality of trenches 204 such that a liquid optical transmission medium may be introduced to the primary reservoirs 212 during the manufacturing process in such a way that the liquid optical transmission medium fills the plurality of trenches 204 (via capillarity or application of a positive pressure as discussed below with reference to FIGS. 7-8) to form waveguides. Similarly, in some embodiments, the secondary reservoirs 214 may be in fluid communication with the one or more channels 206 such that liquid adhesive may be introduced to the secondary reservoirs. In this way, the liquid adhesive may fill the one or more channels 206, thereby serving to secure the base member 200 to the lid member 400 when the base and lid member are in engagement with each other, as described in greater detail below. As is illustrated by FIGS. 2-3, the primary reservoirs 212 and secondary reservoirs 214 may be disposed proximate the plurality of trenches 204 and the one or more channels 206, respectively, such that respective liquids introduced into the first and second reservoirs are able to flow into the corresponding trenches and channels.

Figure 4:
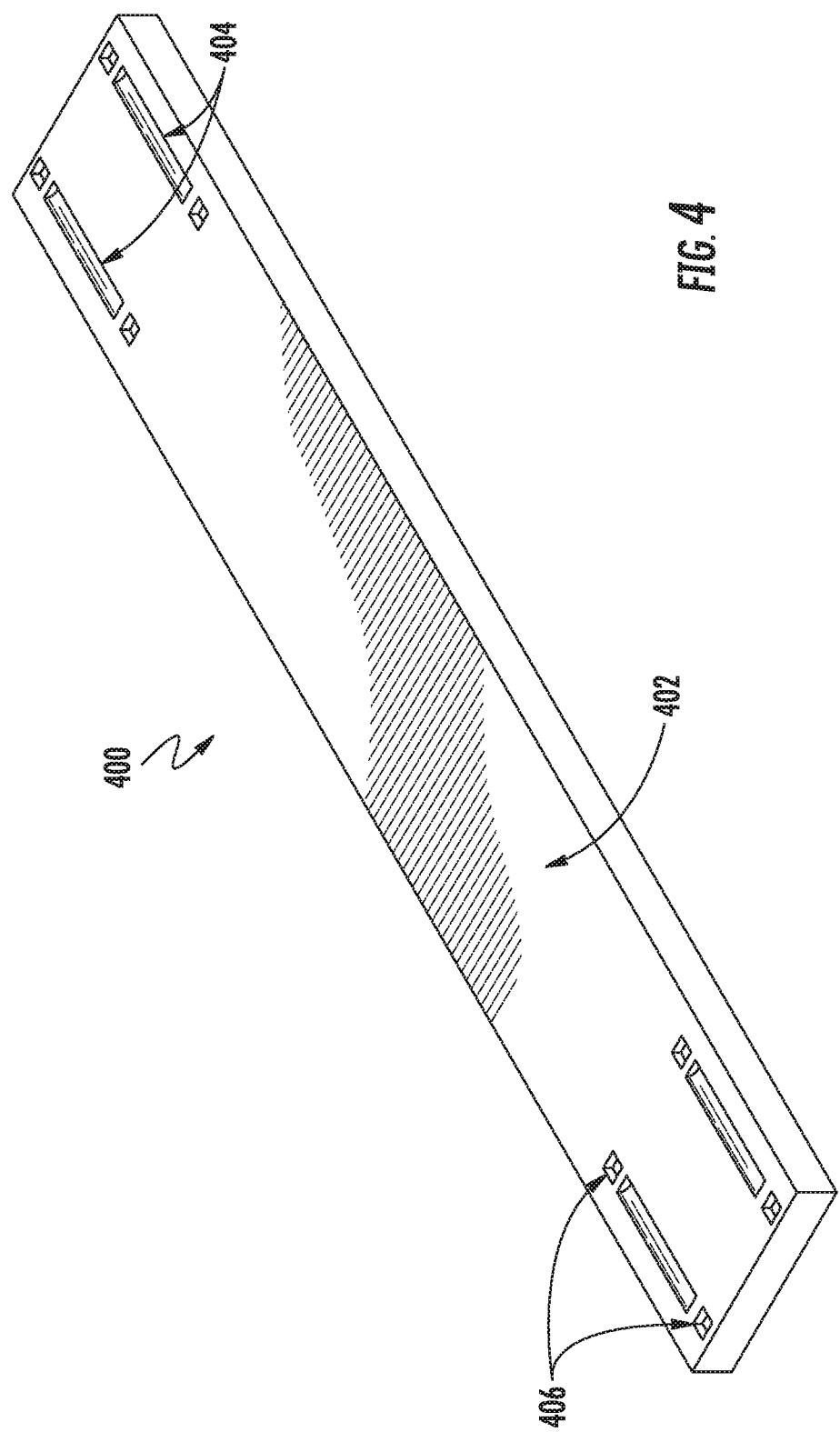
FIG. 4 is a bottom perspective view of an optical waveguide lid member prior to assembly according to an example embodiment.

With reference to FIG. 4, a bottom perspective view of the lid member 400 is shown. As illustrated in FIG. 4, the lid member 400 may define a first surface 402, an engagement cavity 404, and one or more alignment features 406. As described above, the first surface 402 of the lid member 400 may be configured to abut the first surface 202 of the base member 200. Additionally, the engagement element cavity 404 (e.g., cavity 404) may, in some embodiments, define a semi-cylindrical cavity configured to match (e.g., align with respect to location, size, and/or shape) the corresponding semi-cylindrical cavity 208 disposed on the first surface 202 of the base member 200. When the first surface 420 of the lid member 400 abuts the first surface 202 of the base member, the cavities 404 and 208 may thus cooperate to form a cylindrical cavity such that a cylindrical engagement element may be disposed therein. Although described as a cylindrical cavity, the present disclosure contemplates that an engagement cavity of any dimension or cross-sectional shape may be used to receive an engagement element of any corresponding size and shape. Similarly, the one or more alignment features 406 may, in some embodiments, define a female alignment feature (e.g., port, cavity, recess, or the like) configured to receive a corresponding male alignment feature 210 (e.g., extension, knob, protrusion, or the like) defined by the first surface 202 of the base member 200. Although described in reference to a semi-cylindrical cavity, the present disclosure contemplates that the lid member 400 may define an engagement element cavity 404 of any cross-sectional shape as shown in FIG. 9B. Additionally, in some embodiments, the engagement element cavity 404 of the lid member 400 may have a different cross-sectional shape compared to the engagement element cavity 208 of the base member 200.

Figure 5:
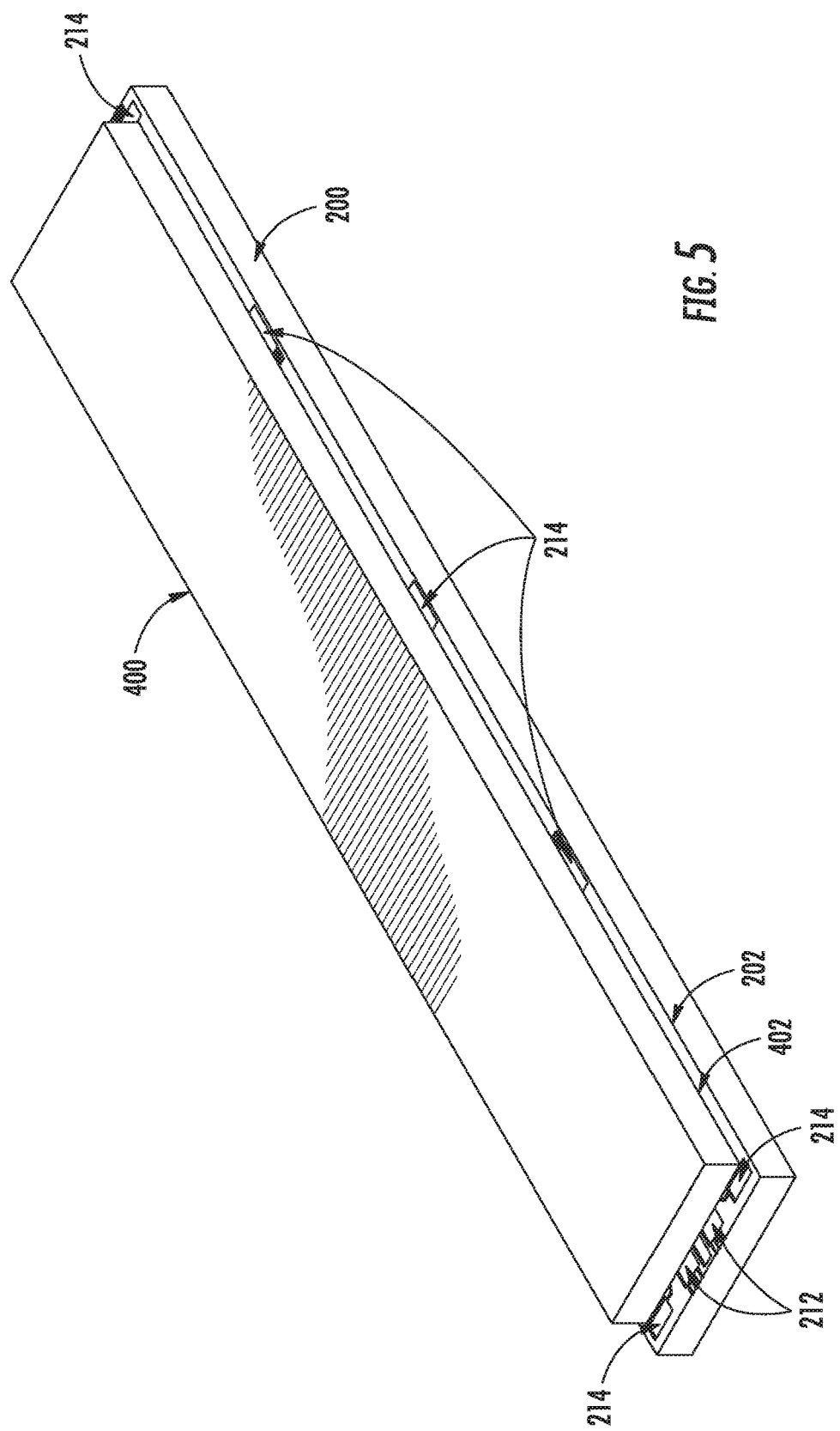
FIG. 5 is an perspective view of optical waveguide base and lid members prior to assembly according to an example embodiment.

With reference to FIG. 5, the base member 200 and lid member 400 are illustrated affixed to one another. As can be seen in FIG. 5, the first surface 202 of the base member 200 abuts the first surface 402 of the lid member 400 such that the optical transmission medium disposed in the plurality of trenches 204 and the adhesive material disposed in the one or more channels 206 contact both the first surface 202 of the base member 200 and the first surface 402 of the lid member 400. As a result of this contact and as described above, the adhesive material disposed in the one or more channels 206 may serve to affix or otherwise secure the lid member 400 to the base member 200 so as to form the optical waveguide structure. Additionally, the contact between the lid member 400 and base member 200 may be such that the plurality of trenches 204 containing the optical transmission medium may form optical waveguides capable of transmitting optical signals therethrough. Particularly, the material of the base member 200 and the lid member 400 may have a lower index of refraction relative to the optical transmission medium such that when the optical transmission medium disposed in the plurality of trenches 204 is encompassed or surrounded by the base member 200 and lid member 400, optical signals may be communicated along the optical transmission medium.

As shown in FIG. 5, in some embodiments, the lid member 400 and base member 200 may be dimensioned such that the base member is larger than the lid member. For example, at least a portion of the base member 200 may extend beyond an edge of the lid member 400, as shown. In such an embodiment, the primary reservoirs 212 and the secondary reservoirs 214 may disposed on the portion of the base member 200 which extends beyond the edge of the lid member, thereby providing an access point for application of the liquid optical transmission medium and the liquid adhesive to the primary reservoirs 212 and the secondary reservoirs 214, respectively. In some other embodiments, the lid member 400 and the base member 200 may be dimensioned such that the edge of the lid member 400 and the edge of the base member 200 abut. In such an embodiment, the primary reservoirs 212 and the secondary reservoirs 214 may function as funnels such that an optical transmission medium and liquid adhesive may be applied to their respective reservoirs, and the optical transmission medium and the liquid adhesive may again fill the plurality of trenches and the one or more channels via capillary flow or application of a positive pressure.

Figure 6:
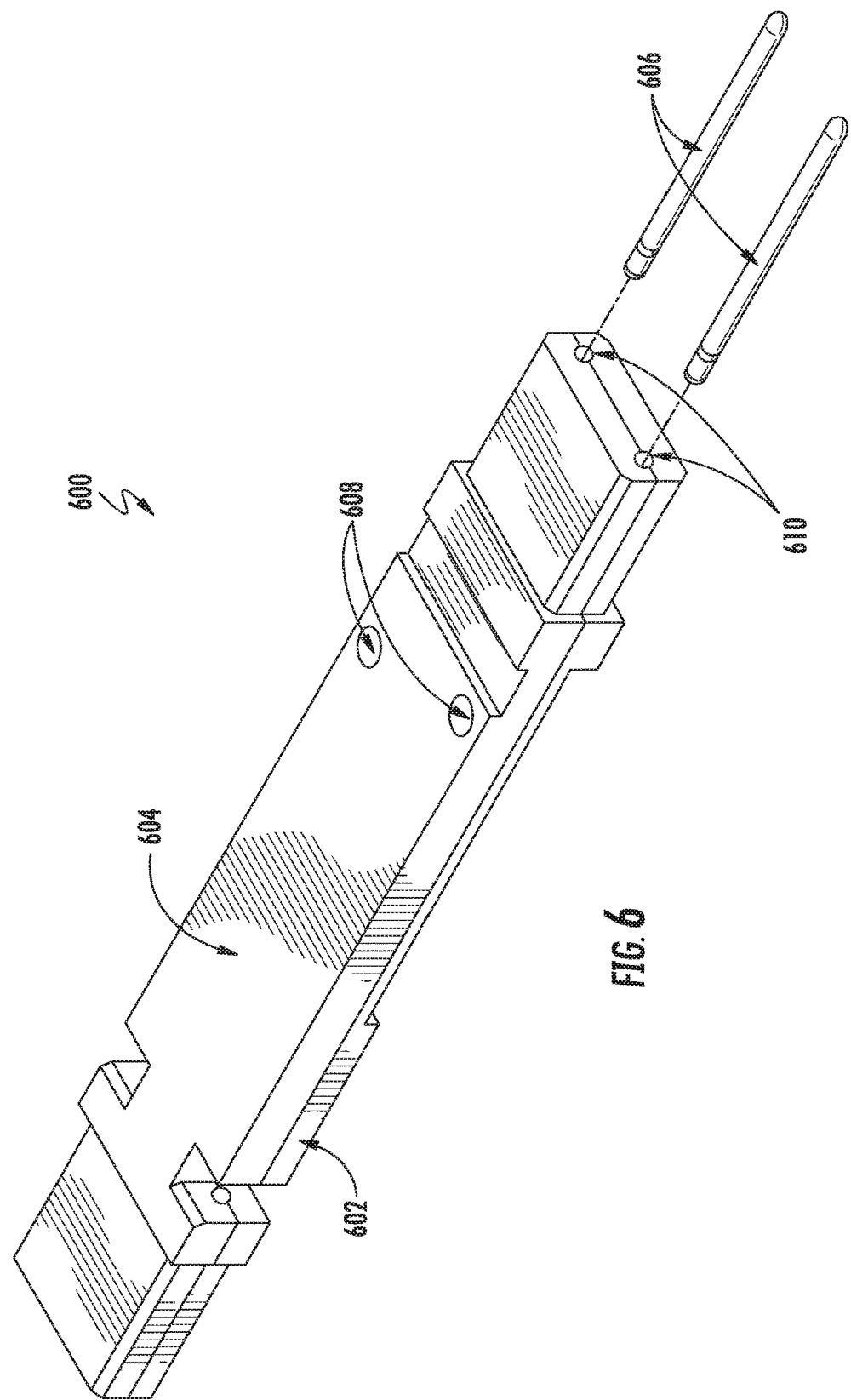
FIG. 6 is a machined optical waveguide structure according to an example embodiment.

With reference to FIG. 6, a machined optical waveguide structure 600 is illustrated. The machined optical waveguide structure may be defined by a lid member 604 affixed to a base member 602 as described above. Following affixing the lid member 604 and the base member 602 to one another, a machining process may be used to create the machined optical waveguide structure 600. In some embodiments, the optical waveguide structure (e.g., optical waveguide structure 102 and/or machined optical waveguide structure 600) may further define an engagement element(s) 606 disposed within one or more of the cylindrical engagement cavities 610. The engagement element(s) 606 may, in embodiments, comprise precisely manufactured pin(s). The machined optical waveguide structure 600 may comprise through-holes 608, where the through-holes may be configured, along with the engagement elements 606, to allow the machined optical waveguide structure 600 to be received and secured within the optoelectronic connector (e.g., optoelectronic connector 100 shown in FIG. 1), and further align the machined optical waveguide structure 600.

With reference to FIGS. 9A-9C, as described above, various alternative cross-sectional shapes applicable to the plurality of trenches, the at least one channel, the engagement element cavity, and/or the engagement element are shown. In particular, FIG. 9A illustrates an example embodiment where the engagement element cavity (e.g., engagement element cavity 208 in FIG. 2A) comprises a cavity having a hexagonal cross-section. In such an embodiment, a corresponding cylindrical engagement element (e.g., engagement element 606 in FIG. 6) may be affixed within the hexagonal engagement element cavity. With reference to FIG. 9B, an example embodiment is shown where the engagement element cavity is defined separately by the lid member and the base member (e.g., lid member 400 and base member 200 in FIG. 5). In such an embodiment, the lid member may define a portion of the engagement element cavity having a rectangular cross-section, and the base member may define a portion of the engagement element cavity having a half-hexagonal cross-section. When the lid member is affixed to the base member as described above, the engagement element cavity as shown in FIG. 9B may be configured to receive a cylindrical engagement element similar to FIG. 9A. With reference to FIG. 9C, various cross-sectional shapes and configurations which are contemplated by the present disclosure are illustrated. These cross-sectional shapes, among others, may be utilized by the optical waveguide structure with any of the plurality of trenches, the at least one channel, the engagement element cavity, and/or the engagement element.

Example Method of Manufacture

Figure 7:
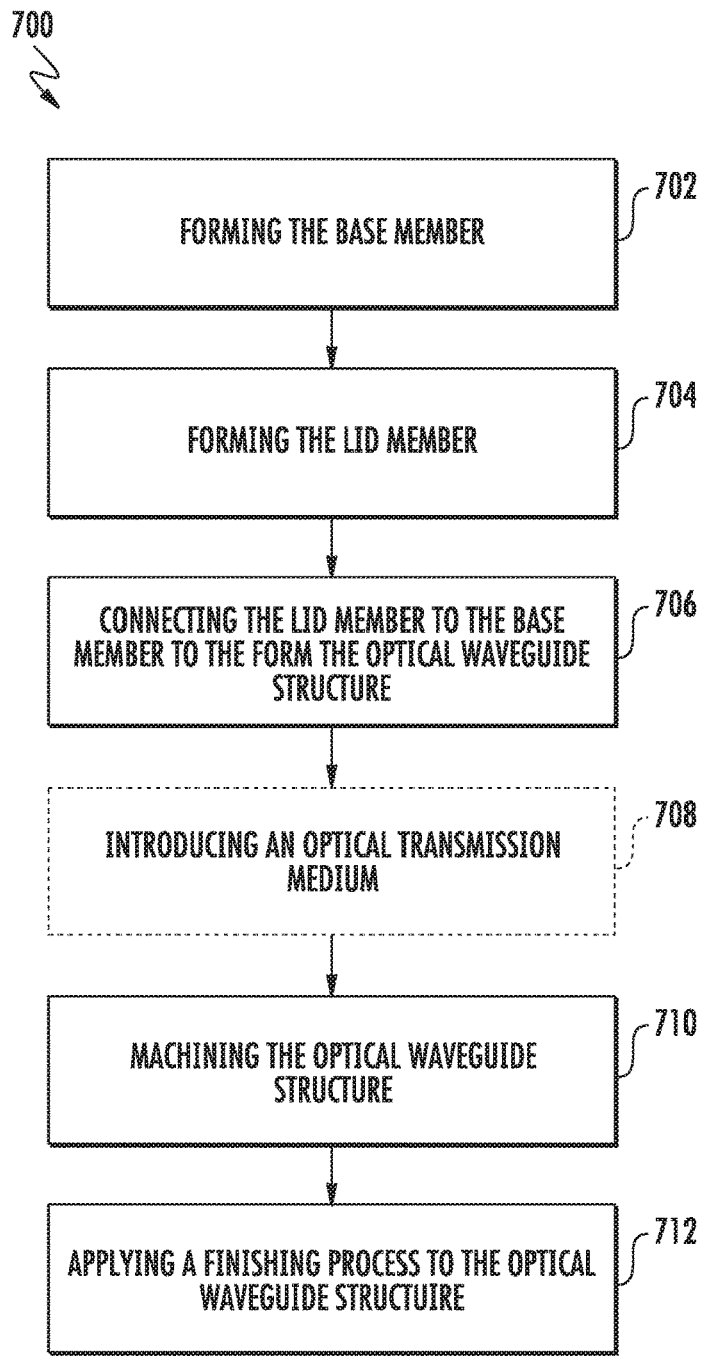
FIG. 7 illustrates a flowchart depicting a method of manufacturing an optical waveguide structure according to an example embodiment.
Figure 8:
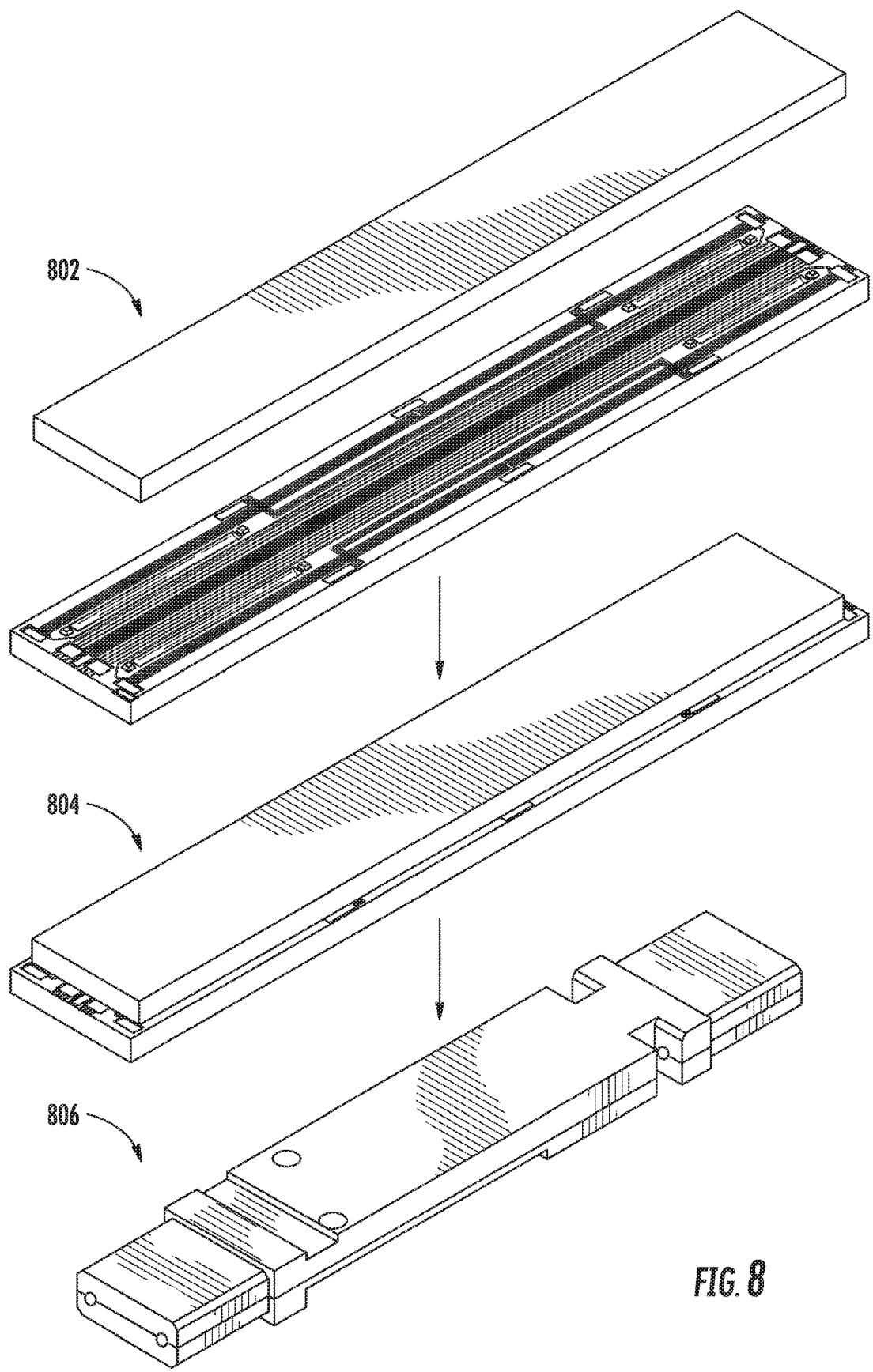
FIG. 8 illustrates stages in the method of manufacturing of FIG. 7 according to an example embodiment.

With reference to FIGS. 7-8, a method of manufacturing an optical waveguide structure is illustrated. The method of manufacture (e.g., method 700) may include the steps of forming the base member at Block 702, forming the lid member at Block 704, connecting the lid member to the base member at Block 706 to form an optical waveguide structure, introducing an optical transmission medium at Block 708, machining the optical waveguide structure at Block 710, and applying a finishing process to the optical waveguide structure at Block 712.

The method 700 may include forming the base member (e.g., base member shown in structure 802 in FIG. 8) at Block 702. For example, forming the base member (e.g., base member 200 in FIG. 2) may comprise forming a first surface defining a plurality of trenches configured to receive an optical transmission medium, one or more channels configured to receive an adhesive material, a primary reservoir in fluid communication with the plurality of trenches, and a secondary reservoir in fluid communication with the one or more channels. In some embodiments, the elements defined by the first surface of the base member may be formed via a hot embossing process (e.g., microthermoforming, micromolding, micro injection molding, or the like). In some further embodiments, forming the base member at Block 702 may include forming engagement elements and/or one or more alignment features, as described above. Forming the base member at Block 702 may include sizing the base member to be larger than the lid member, such that at least a portion of the base member extends beyond an edge of the lid member, as described above with respect to FIG. 5.

The method 700 may include forming the lid member (e.g., lid member shown in structure 802 in FIG. 8) at Block 704. For example, forming the lid member (e.g., lid member 400 in FIG. 4) may comprise forming a first surface, where the first surface of the lid member is configured to be disposed against the first surface of the base member, as described above. In some embodiments, the first surface of the lid member may also be formed via a hot embossing process (e.g., microthermoforming, micromolding, micro injection molding, or the like). In some further embodiments, forming the lid member at Block 704 may include forming corresponding engagement elements and/or one or more corresponding alignment features as described above. Similar to forming the base member at Block 702, forming the lid member at Block 704 may include sizing the lid member to be smaller than the base member, such that at least a portion of the base member extends beyond an edge of the lid member to provide access points for the first and second reservoirs, as described above.

The method 700 may include connecting the lid member to the base member at Block 706 to form an optical waveguide structure (e.g., base member and lid member of structure 804 in FIG. 8). Connecting these elements may include placing the lid member on the base member such that the lid member is aligned with and covers at least a portion of the plurality of trenches and at least a portion of the one or more channels defined by the base member. As seen in FIG. 5, in some embodiments, the primary reservoir and the secondary reservoir may be disposed on the portion of the base member which extends beyond the edge of the lid member.

In connecting the lid member to the base member at Block 706, the method 700 may include introducing an optical transmission medium (e.g., in liquid form) into the primary reservoir at Block 708 such that the liquid optical transmission medium flows into and fills the plurality of trenches defined by the base member. Likewise, a liquid adhesive may be introduced into the secondary reservoir such that the liquid adhesive flows into and fills the one or more channels defined by the base member. By way of example, when the primary and secondary reservoirs are disposed on the portion of the base member which extends beyond the edge of the lid member, liquid optical transmission medium and liquid adhesive may be placed (e.g., via droplet, pipette or the like) into the primary and secondary reservoir such that the liquids may fill their respective trenches and channels. In connecting the lid member to the base member at Block 706, the present disclosure contemplates that the liquid materials (e.g., liquid adhesive material and liquid optical transmission medium) may be allowed to cure or otherwise harden (e.g., by ultra-violet curing or the like).

In connecting the lid member and the base member at Block 706 and introducing an optical transmission medium at Block 708, the liquid optical transmission medium and the liquid adhesive may, in some embodiments, fill the plurality of trenches and the one or more channels, respectively, via capillary flow or application of a positive pressure. As would be understood by one of ordinary skill in the art in light of the present disclosure, capillary flow (e.g., capillary motion, wicking, positive pressure, or the like) may allow liquid to flow in narrow spaces without the assistance of external forces. Capillary flow occurs due to intermolecular forces between the liquid and surrounding solid surface (e.g., surface tension, cohesion of liquid molecules, and/or adhesion to solid walls of the structure) drawing the liquid to fill an area. With regard to the optical waveguide structure, particularly the plurality of trenches and one or more channels, the respective liquid may be drawn from the reservoirs to fill the plurality of trenches and the one or more channels, respectively, due to the intermolecular forces of the liquid interacting with the relatively narrow structure of the plurality of trenches and one or more channels. Further, the use of capillary flow or application of a positive pressure to fill the plurality of trenches and the one or more channels may also serve to reduce spillage of materials disposed therein (e.g., optical transmission medium and adhesive material, respectively).

The method 700 may further comprise machining the optical waveguide structure at Block 710 (e.g., machine optical waveguide structure 806 in FIG. 8). The machining process may include removing the portion of the base member which extends beyond the edge of the lid member. By way of example, the machine process may remove this portion such that the lid member and base member are flush with one another. Further, removing the portion of the base member which extends beyond the edge of the lid member may, in some embodiments, remove the primary and secondary reservoirs disposed on this portion of the base member. In such an embodiment, the plurality of trenches comprising optical transmission medium may, as a result, abut the outer edge of the optical waveguide structure such that an optical signal may be transmitted therethrough and output from the optical waveguide structure and into an adjoining structure (or input into the optical waveguide structure from an adjoining structure). In some embodiments, forming the base member and lid member at Blocks 702, 704 (e.g., by microthermoforming, micromolding, micro injection molding, or the like) may include creating the external shape of the optical waveguide structure as seen, for example, in the machined optical waveguide structure 600 of FIG. 6.

In some further embodiments, the machining process may include forming through-holes in the optical waveguide structure. The through-holes may be configured to allow the optical waveguide structure to be received and secured within the optoelectronic connector. As seen in FIG. 6, for example, the machined optical waveguide structure 600 may define through-holes 608 configured to receive an engagement element (e.g., a pin, or the like) defined by the optoelectronic connector 100. The machining process may include any or all of micro machining, turning, milling, drilling, grinding, water jet cutting, EDM, EDM, AFM, USM, CNC, and/or the like, in any order or combination.

The method 700 may also comprise applying a finishing process to the optical waveguide structure at Block 712. To produce a finalized or finished optical waveguide structure, the method 700 may include applying a lapping process (e.g., sanding, grinding, surface refining, or the like) to refine the outer surfaces of the optical waveguide structure. Particularly, the optical transmission medium disposed within the plurality of trenches may contact the outer edge of the optical waveguide structure. In order to ensure accurate optical transmission therethrough and/or minimize signal losses, the lapping processing may also be applied to the exposed optical transmission medium. In some embodiments, applying a finishing process to the optical waveguide structure at Block 712 may include applying a scratch resistant or end-face coating to the exterior of the optical waveguide structure 102. Such a scratch resistant coating may serve to provide resilience to the optical waveguide structure 102 such that the optical waveguide structure 102 may be repeatedly connected with and removed from an optoelectronic connector (e.g., optoelectronic connector 100 in FIG. 1). This end-face coating may further function to provide surface protection, increase or decrease reflection and/or attenuation, or serve as an optical filter.

The optical waveguide structure 102 may be created from a variety of materials compatible for use in datacenter switch modules and systems. In some embodiments, the optical waveguide structure, specifically the base member and lid member (e.g., the clad material), may be comprised of a polycarbonate material such as Makrolon® GP, Topas Advanced Polymers® 6013 S-04, Topas Advanced Polymers® 6017S-04, Topas Advanced Polymers® 8007S-04, PLEXIGLAS® Film 99524, LEXAN™ 9030, or the like. In some embodiments, the optical transmission medium (e.g., the core material) that fills the trenches may be comprised of an amorphous fluoropolymer (e.g., CYTOP or the like), a LIGHTLINK™ photo-imageable silicon-based polymer material, or a DYMAX Ultra Light-Weld® 3031 material. In some other embodiments, the optical transmission medium may be comprised of a polytetrafluoroethylene ("PTEE"), perfluoroalkoxy alkanes ("PFA"), and/or polymethyl methacrylate ("PMMA") material. Regardless of material choice, the present disclosure contemplates that the optical transmission medium may comprise a material with an index of refraction that is greater than the index of refraction of the material selected for the base and lid members (e.g., the index of refraction of the core is higher than the index of refraction of the clad).

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components (e.g., components of printed circuit boards, transceivers, cables, etc.) may be used in conjunction with the optical waveguide structure. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in FIGS. 7-8, and in some cases one or more of the steps depicted may occur substantially simultaneously, or additional steps may be involved. Although specific terms are employed herein, they are used in a generic and descriptive sense only and not for purposes of limitation.

What is claimed is:

1. A method for manufacturing an optical waveguide structure for use within an optoelectronic connector, the method comprising:
    forming a base member having a first surface, the first surface defining:
        a plurality of trenches configured to receive an optical transmission medium,
        one or more channels configured to receive an adhesive material,
        a primary reservoir in fluid communication with the plurality of trenches, and
        a secondary reservoir in fluid communication with the one or more channels;
    forming a lid member having a first surface, wherein the first surface of the lid member is configured to be disposed against the first surface of the base member;
    placing the lid member on the base member such that the lid member covers at least a portion of the plurality of trenches and at least a portion of the one or more channels;
    introducing a liquid optical transmission medium into the primary reservoir such that the liquid optical transmission medium fills the plurality of trenches defined by the base member; and
    introducing a liquid adhesive into the secondary reservoir such that the liquid adhesive fills the one or more channels defined by the base member, thereby affixing the lid member to the base member.

2. The method according to claim 1, wherein the liquid optical transmission medium and the liquid adhesive fill the plurality of trenches and the one or more channels, respectively, via capillary flow.

3. The method according to claim 1, wherein forming the base member comprises sizing the base member to be larger than the lid member, such that at least a portion of the base member extends beyond an edge of the lid member.

4. The method according to claim 3, wherein the primary reservoir and the secondary reservoir are disposed on the portion of the base member which extends beyond the edge of the lid member.

5. The method according to claim 3, further comprising removing the portion of the base member which extends beyond the edge of the lid member.

6. The method according to claim 5, further comprising finishing an outer surface of the optical waveguide structure to facilitate transmission of optical signals therethrough.

7. The method according to claim 1, further comprising forming through-holes on the optical waveguide structure, wherein the through-holes are configured to allow the optical waveguide structure to be received and secured within the optoelectronic connector.

8. The method according to claim 1, wherein forming the lid member and forming the base member are achieved via a hot embossing process.

9. The method according to claim 1, wherein the primary reservoir comprises two or more primary reservoirs and the secondary reservoir comprises two or more secondary reservoirs, wherein each primary reservoir and each secondary reservoir is in fluid communication with a portion of the plurality of trenches and a portion of the one or more channels, respectively.

10. The method according to claim 1, wherein the base member further comprises at least one groove and the lid member further comprises at least one corresponding groove such that the optical waveguide structure is configured to receive an engagement element when the lid member is placed on the base member.

* * * * *

UNITED STATES PATENT AND TRADEMARK OFFICE
CERTIFICATE OF CORRECTION

PATENT NO. : 10,151,888 B2
APPLICATION NO. : 15/472703
DATED : December 11, 2018
INVENTOR(S) : Badehi et al.

Page 1 of 1

It is certified that error appears in the above-identified patent and that said Letters Patent is hereby corrected as shown below:

On the Title Page

Item (72) Inventors: "Yaniv Kazav" should read --Yaniv Katzav--.

Signed and Sealed this
Sixteenth Day of April, 2019

Andrei Iancu
*Director of the United States Patent and Trademark Office*